United States Patent
Dwornicki et al.

(10) Patent No.: US 9,738,747 B2
(45) Date of Patent: Aug. 22, 2017

(54) ONE COMPONENT ISOCYANATE PREPOLYMER MIXTURE FOR POLYURETHANE PRODUCT FORMULATION IN A SINGLE STEP PROCESS

(71) Applicant: Selena Labs Sp. z o.o., Siechnice (PL)

(72) Inventors: Przemyslaw Dwornicki, Wroclaw (PL); Marek Barth, Zabrze (PL); Tomasz Pawlus, Pieszyce (PL)

(73) Assignee: Selena Labs Sp. z o.o. (PL)

( * ) Notice: Subject to any disclaimer, the term of this patent is extended or adjusted under 35 U.S.C. 154(b) by 180 days.

(21) Appl. No.: 14/520,865

(22) Filed: Oct. 22, 2014

(65) Prior Publication Data
US 2015/0197596 A1    Jul. 16, 2015

(30) Foreign Application Priority Data
Jan. 14, 2014   (PL) ........................................ 406843

(51) Int. Cl.
| | | |
|---|---|---|
| *C08G 18/08* | (2006.01) | |
| *C08G 18/76* | (2006.01) | |
| *C08J 9/14* | (2006.01) | |
| *C08G 18/12* | (2006.01) | |
| *C08G 18/28* | (2006.01) | |
| *C08G 18/48* | (2006.01) | |

(52) U.S. Cl.
CPC ............ *C08G 18/14* (2013.01); *C08G 18/12* (2013.01); *C08G 18/2835* (2013.01); *C08G 18/48* (2013.01); *C08G 18/4812* (2013.01); *C08G 18/7664* (2013.01); *C08G 18/7671* (2013.01); *C08J 9/141* (2013.01); *C08J 9/142* (2013.01); *C08J 9/149* (2013.01); *C08J 2203/12* (2013.01); *C08J 2203/14* (2013.01); *C08J 2203/182* (2013.01); *C08J 2207/04* (2013.01); *C08J 2375/08* (2013.01)

(58) Field of Classification Search
CPC .... C08G 18/12; C08G 18/14; C08G 18/2835; C08G 18/307; C08G 18/48; C08G 18/4812; C08G 18/7664; C08G 18/7671; C08J 9/141; C08J 9/142; C08J 9/149; C08J 2203/12; C08J 2203/14; C08J 2203/182; C08J 2207/04; C08J 2375/08
See application file for complete search history.

(56) References Cited

U.S. PATENT DOCUMENTS

| | | | |
|---|---|---|---|
| 4,623,709 A | 11/1986 | Bauriedel | |
| 5,441,808 A | 8/1995 | Anderson et al. | |
| 6,515,164 B1 | 2/2003 | Bolte et al. | |
| 6,894,083 B2 | 5/2005 | Braun et al. | |
| 2004/0214910 A1* | 10/2004 | Kluth | C08G 18/10 521/159 |
| 2005/0137030 A1* | 6/2005 | Sullivan | A63B 37/0003 473/371 |
| 2010/0152381 A1* | 6/2010 | Savino | C08G 18/10 524/872 |

FOREIGN PATENT DOCUMENTS

| | | |
|---|---|---|
| EP | 0672694 A1 | 9/1995 |
| EP | 2481764 A1 | 8/2012 |
| WO | 2014123434 A1 | 8/2014 |

* cited by examiner

*Primary Examiner* — John Cooney
(74) *Attorney, Agent, or Firm* — Lerner, David, Littenberg, Krumholz & Mentlik, LLP

(57) ABSTRACT

A one component isocyanate prepolymer mixture for formulating a polyurethane product in a single step process, with monomeric methylene diphenyl diisocyanate (MDI) content in the mixture not exceeding 3%, preferably less than 2%, more preferably less than 1% of the total weight. The mixture contains monofunctional alcohol, an isocyanate component or isocyanate mixture component, propellant, catalyst, stabiliser, and one or more polyols. The monofunctional alcohol constitutes ethylene glycol ethers or propylene glycol ethers. A method for formulating a one component polyurethane foam on the basis of the mixture is disclosed.

16 Claims, No Drawings

ONE COMPONENT ISOCYANATE PREPOLYMER MIXTURE FOR POLYURETHANE PRODUCT FORMULATION IN A SINGLE STEP PROCESS

CROSS-REFERENCE TO RELATED APPLICATIONS

The present application claims priority from Polish Patent Application No. P.406843 filed Jan. 14, 2014, the disclosure of which is hereby incorporated herein by reference.

BACKGROUND OF THE INVENTION

Polyurethane prepolymers have many different industrial applications. Numerous systems are formulated from isocyanate systems containing volatile isocyanate monomers such as methylene diphenyl diisocyanate (MDI). Such use includes foams, adhesives, undercarriage coatings, vehicular silencer systems, elastomer elements and articles. The subject of interest by industrial circles lies in minimising the risk of exposure to volatile isocyanate monomers, which may be harmful to the health of staff. Thus, there exists a need to reduce the concentration of isocyanate monomers in precursors and polyurethane prepolymers.

One solution known from the current state of the art is removal of volatile isocyanate monomers from the prepolymer system using a distillation technique such as a wiped film evaporator. See Anderson et al, U.S. Pat. No. 5,441,808, column 6, lines 29-34. This solution requires an additional unit operation, increasing investment and operational costs for formulating such prepolymers.

Another solution known to the current state of the art encompasses formulating prepolymers in a two step process, where in the first step polyhydric alcohols react with asymmetric isocyanate with isocyanate groups of different reactivity. Polyols preferentially react with the more reactive group. This process continues until the theoretical quantity of the faster-reacting isocyanates reacts with polyhydric alcohols. Then the product of the reaction is subject to a reaction with an even faster-reacting symmetric isocyanate in order to form the prepolymer. The two phase process also requires an additional unit operation. The extra step and additional cost required to handle the second isocyanate significantly increases the costs of this process. See Bolte et al, U.S. Pat. No. 6,515,164 and Bauriedel, U.S. Pat. No. 4,623,709. This process requires very precise processing conditions to be determined and due to the chain growth limitation provides lower flexibility with reference to the target prepolymer viscosity and prevents specialists from readjusting the prepolymer to satisfy the defined target properties.

European Patent Application No. EP2481764 discloses the use of a monofunctional alcohol in a prepolymer composition, with a molecular mass of at least 130 g/mol and a paraffin structure, favourable for 2-ethylhexyl alcohol. In the aforementioned patent application, two components are formed in the first step. Component A was formulated by mixing at room temperature for 20 min, adding the following ingredients: castor oil, ethylene glycol, dimorpholinodiethylether (DMDEE), TCPP and silicone-surfactant (Tegostab B8870). Component B was formulated separately by mixing at room temperature for 35 minutes: crude MDI (Supersec 5025) with 2-ethylhexyl alcohol, and once the two components are mixed, an NCO terminated TDI prepolymer was added and then mixed. Then Components A and B were put into a valved can and porophors were injected. The next phase involved shaking the can for 2-3 minutes. The aforementioned method is a two step method for formulating OCF foam with low MDI content. However, it is relatively complicated. Due to the low MDI content, being NCO prepolymer solvent, the foam viscosity is increased.

International Patent Application No. PCT/PL2013/050002 talks about a one component isocyanate prepolymer mixture for formulating a polyurethane product in a single step process, with monomeric methylene diphenyl diisocyanate (MDI) content in the said mixture not exceeding 3% of the total weight containing tertiary monofunctional alcohol, an isocyanate component or isocyanate component mixture, propellant, catalyst, stabiliser and one or more polyols. The said prepolymer mixture uses tertiary alcohols, which prior to their use in the process require melting prior to being used in the primary reactor. Thus, polyurethane prepolymers are required which contain low concentrations of volatile isocyanate monomers, whereas the prepolymer may be formulated using standard, commercially available isocyanate monomer systems with the application of conventional techniques. Compositions and foam system containing such prepolymer are also required. Furthermore, such prepolymers are required, which may be formulated without the need to use additional separate unit operations or complex process steps which have to be separated due to their exothermic properties, which may cause the occurrence of excessive, unwanted pressure in the can, even during the step of preparing substrates for the prepolymer formulation reaction, i.e., melting solid tertiary alcohols. Additionally, it is required to eliminate high cost compounds such as the TDI prepolymer. Furthermore, the obtained prepolymer and foam should exhibit the standard yield of the end foam. Unexpectedly, the present invention solves the above problems.

SUMMARY OF THE INVENTION

The first subject of the present invention is a one component isocyanate prepolymer mixture for formulating a polyurethane product in a single step process, with monomeric methylene diphenyl diisocyanate (MDI) content in the mixture not exceeding 3%, preferably less than 2%, more preferably less than 1% of the total weight, containing:
  a monofunctional alcohol,
  an isocyanate component or isocyanate mixture component,
  a propellant,
  a catalyst,
  a stabiliser, and
  one or more polyols,
characteristic in that, the monofunctional alcohol constitutes ethylene glycol ethers or propylene glycol ethers, preferably taken from a group containing 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)etahnol, 2-(2-butoxyetoxy)ethanol, 1-methoxy-2-propanol, 1-ethoxy-2-propanol, 1-propoxy-2-propanol, 5-methyl-4,7-dioxa-2-heptanol, 5-methyl-4,7-dioxa-2-decanol, 2-(2-butoxymethyletoxy)methyletoxy)propanol, 1-butoxy-2-propanol, 1-(2-butoxy-1-propoxy)2-propanol, and [2-(2-methoxypropoxy)propoxy]propanol. Preferably, the propellant constitutes a gas selected from a group including dimethyl ether, isobutane and propane or mixtures thereof in gas or their mixtures from 10% to 40%, preferably from 14% to 30%, even more preferably from 18% to 24%.

Preferably, the catalyst quantity is between 0.1% to 2%, preferably from 0.2% to 1.5%, even more preferably from 0.3% to 1%. Preferably, a stabiliser with a chemical composition of a modified organic silicone copolymer is taken from a group comprising silicone glycol copolymer (for example, Dabco DC198 or DC193 by Air Products), non-hydrolyzable silicone glycol copolymer (for example, DC5000 by Air Products), siloxane polyoxyalkylene copolymer (for example, Niax L-6164 by Momentive), methylsiloxane polyoxyalkylene copolymer (for example, Niax L-5348 by Momentive), polyether-polysiloxane copolymer (for example, Tegostab B8870 by Evonik), polydimethylsiloxane polyether copolymer (for example, Tegostab B8526 by Evonik), polyether siloxane (for example, Tegostab B8951 or B84702 by Evonik), polyether modified polysiloxane copolymer (for example, Tegostab B8871 by Evonik), as well as derivatives and their mixtures. More preferably, the proportion NCO:OH is from 1 to 3, equally preferably from 1.5 to 2.7, more preferably 1.9 to 2.5. More preferably, the mixture contains chloroparaffin, preferably medium chain C14-C17 in quantity from 5% to 70%, preferably from 10% to 50%, more preferably from 18% to 40% or long chain chloroparaffin C18-C20 in quantity from 10% to 70%, preferably from 30% to 60%, more preferably from 40% to 50%. More preferably, the mixture contains trifunctional polyol with molecular mass from 400 to 1000, preferably one or more difunctional polyols with molecular mass from 400 to 2000.

The second subject of the invention is a method for formulating one component polyurethane foam characteristic in that it includes the following steps:
a dosing container is prepared,
a mixture defined in any one of the claims from 1 to 7 is transported to the container, preferably keeping the propellant outside of the container,
the dosing container is closed, and preferably the propellant is fed into the container.

DETAILED DESCRIPTION

The invention pertains to the composition of the one component foam (OCF) with low content of monomeric diisocyanate (2,2'-methylenediphenyl isocyanate, 2,4'-methylenediphenyl isocyanate and 4,4'-methylenediphenyl isocyanate). The present invention allows the use of commercially available isocyanates, polyols, and stabilisers which generally occur with the formulation of OCF. The sole difference is the fact that in the present invention there is no need to use additional prepolymers as compared with solutions known to the current state of the art, with the initial substrate heating being eliminated, i.e., tertiary alcohols, due to which the formulation of the prepolymer mixture is quicker, less problematic and cheaper.

In the examples below (1-4), a polyols mixture was prepared first by adding trifunctional polyether polyol, which is commercially available as Rokopol G1000 (Rokita); adding trifunctional polyether polyol with molecular mass 400-1000; adding difunctional polyol polyether with molecular mass 400-2000; adding medium chain chloroparaffin C14-C17 or long chain C18-C20 or their mixture; adding mono alcohol, preferably 1-metoxy-2-propanol, which is commercially available as Dowanol PM (DOW); adding a stabiliser, preferably a mixture of stabilisers which, for example, are taken from a group containing: Dabco DC198 (AirProducts), Dabco DC193 (AirProducts), Dabco DC5000 (AirProducts), Dabco DC5357 (AirProducts), Niax L-6164 (Momentive), Niax L-5348 (Momentive), Tegostab B84702 (Evonik), Tegostab B8870 (Evonik), Tegostab B8526 (Evonik), Tegostab B8951 (Evonik), and Tegostab B8871 (Evonik); and adding a catalyst which is commercially available as Jeffcat DMDLS (chemical name: 2,2'-dimorpholinodiethylether).

Then the polyols mixture was mixed in a hermetically closed vessel protecting against moisture at room temperature for 10 minutes. The polyols mixture and the technical diphenyl diisocyanate, with NCO content on the order of 31 wt. % and commercially available as Desmodure 44V70L (Bayer) or Lupranat M70 (Basf) or their mixture, were added to the single use pressure container. Dimethyl ether and isobutene were fed into the pressure container, which was then shaken until complete mixing of polyols with isocyanates. The monomeric content was below 1 wt. % in relation to the entire composition.

|  | Ex1 | Ex2 | Ex3 | Ex4 |
| --- | --- | --- | --- | --- |
| Isomer and methylenediphenyl isocyanate homologues mixture (Desmodure 44V70L/Lupranate M70) | 196 | 196 | 196 | 196 |
| Polyether polyol (Rokopol G1000) | 46 | 46 | 46 | 46 |
| Polyether polyol triol (Mw 400-1000) | 27 | 27 | 27 | 27 |
| Polyether polyol diol (Mw 400-2000) | 12 | 12 | 12 | 12 |
| 1-methoxy-2-propanol | 24 | 24 | 24 | 24 |
| Stabiliser | 12 | 18 | 12 | 18 |
| Medium chain chloroparaffin C14-C17 | 483 |  |  | 198 |
| Long chain chloroparaffin C18-C20 |  | 477 | 483 | 279 |
| Catalyst | 4 | 4 | 4 | 4 |
| Propane | 32 | 32 | 32 | 32 |
| Isobutane | 74 | 74 | 74 | 74 |
| Dimethyl ether | 90 | 90 | 90 | 90 |
| TOTAL | 1000 | 1000 | 1000 | 1000 |

The most important issue in OCF foams is prepolymer viscosity in the pressure container. It is known that monomeric MDI is a good solvent for NCO polymers, however its content in the disclosed invention is less than 1%. Thus, foams with a low monomer content have higher viscosity. In order to change the viscosity of foam prepolymer inside the pressure vessel, it is important to add a defined proportion of propellant, and in particular, dimethyl ether DME. Dimethyl ether was used in 1:1.17 proportion with respect to the isobutane and propane mixture. In foams with low monomer content, foam yield is lower due to the low content of free monomers containing NCO groups and the limited CO2 generation, which was compensated for by adding porophor.

In this invention, medium chain chloroparaffins and long chain chloroparaffins or their mixture may be used. Due to environmental protection issues, the use of long chain chloroparaffins is preferable. The term "long chain" should be understood as more than 17 atoms in a chain.

A significant factor is low proportion of NCO:OH from 1 to 3, preferably from 1.5 to 2.7, more preferably 1.9 to 2.5. The low proportion of NCO:OH is very significant in order to achieve monomer content below 3%, preferably below 2%, more preferably below 1%. Substituting tertiary alcohols with glycol ethers reduced mixture preparation time by 20% and allowed for a 15% saving in energy consumption. Thus, the process became faster and more energy efficient.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A one component isocyanate prepolymer mixture for formulating a polyurethane foam product in a single step process, the mixture comprising:
   (a) monomeric methylene diphenyl diisocyanate (MDI) at a content in the mixture not exceeding 3% of the total weight of the mixture,
   (b) a monofunctional alcohol compound,
   (c) an isocyanate-containing component,
   (d) a propellant,
   (e) a catalyst,
   (f) a stabiliser, and
   (g) one or more polyols,
   wherein the monofunctional alcohol compound is an ethylene glycol ether or propylene glycol ether, selected from the group consisting of 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, 1-methoxy-2-propanol, 1-ethoxy-2-propanol, 1-propoxy-2-propanol, 5-methyl-4,7-dioxa-2heptanol, 5-methyl-4,7-dioxa-2-decanol, 2-(2-butoxymethylethoxy)methylethoxy)propanol, 1-butoxy-2-propanol, 1-(2-butoxy-1-propoxy)2-propanol, and [2-(2-methoxypropoxy)propoxy]propanol.

2. The mixture as claimed in claim 1, wherein the propellant comprises a gas selected from the group consisting of dimethyl ether, isobutane, propane and mixtures thereof in an amount of from 10% to 40% by weight of the mixture.

3. The mixture as claimed in claim 1, wherein the catalyst comprises from 0.1% to 2% by weight of the mixture.

4. The mixture as claimed in claim 1, wherein the stabiliser is selected from the group consisting of silicone glycol copolymer, nonhydrolyzable silicone glycol copolymer, siloxane polyoxyalkylene copolymer, methylsiloxane polyoxyalkylene copolymer, polyether-polysiloxane copolymer, polydimethylsiloxane polyether copolymer, polyether siloxane, polyether modified polysiloxane copolymer, their derivatives and their mixtures.

5. The mixture as claimed in claim 1, wherein the proportion NCO:OH is from 1 to 3.

6. The mixture as claimed in claim 1, wherein the mixture contains medium chain, C14-C17, chloroparaffin in a quantity from 5% to 70% by weight of the mixture or long chain, C18-C20, chloroparaffin in a quantity between 10% to 70% of the mixture by weight.

7. The mixture as claimed in claim 1, comprising one or more polyol selected from the group consisting of trifunctional polyols with a molecular mass from 400 to 1000, difunctional polyols with a molecular mass from 400 to 2000 and mixtures thereof.

8. A method for formulating a one component polyurethane foam, the method comprising:
   (a) preparing a dosing container to receive a mixture as claimed in any one of claims 1 to 7, wherein said mixture does not contain propellant;
   (b) transporting said mixture into the container;
   (c) closing the dosing container; and
   (d) feeding the propellant into the closed container.

9. The mixture as claimed in claim 1 wherein the monomeric methylene diphenyl diisocyanate comprises less than 2% of the total weight of the mixture.

10. The mixture as claimed in claim 1 wherein the propellant comprises from 14% to 30% of the mixture.

11. The mixture as claimed in claim 1, wherein the catalyst comprises from 0.2% to 1.5% by weight of the mixture.

12. The mixture as claimed in claim 1, wherein the proportion NCO:OH is from 1.5 to 2.7.

13. The mixture as claimed in claim 1, wherein the mixture contains medium chain, C14-C17, chloroparaffin in a quantity from 10% to 50%, or long chain, C18-C20, chloroparaffin in a quantity from 30% to 60%.

14. The mixture as claimed in claim 1, wherein the polyols comprise one or more difunctional polyol with a molecular mass from 400 to 2000.

15. The mixture as claimed in claim 1, wherein the polyols comprise one or more trifunctional polyol with a molecular mass from 400 to 1000 and one or more difunctional polyols with a molecular mass from 400 to 2000.

16. The mixture as claimed in claim 15, wherein:
   (a) the monomeric methylene diphenyl diisocyanate in the mixture comprises less than 1% of the total weight of the prepolymer mixture;
   (b) the catalyst comprises from 0.3% to 1% by weight of the prepolymer mixture;
   (c) the proportion NCO:OH is from 1.9 to 2.5; and
   (d) the mixture contains medium chain, C14-C17, chloroparaffin in a quantity from 18% to 40% by weight of the mixture or long chain, C18-C20, chloroparaffin in a quantity from 40% to 50% by weight of the mixture.

* * * * *